United States Patent [19]

Juraschek et al.

[11] Patent Number: 5,801,686

[45] Date of Patent: Sep. 1, 1998

[54] COMPUTER DISPLAY SYSTEMS

[75] Inventors: Nicholas Heinrich Juraschek, Hertfordshire; Raymond Malcolm Livesley, Berkshire, both of United Kingdom

[73] Assignee: Videologic Limited, Hertfordshire, United Kingdom

[21] Appl. No.: 612,600

[22] Filed: Feb. 28, 1996

[51] Int. Cl.$^6$ .................................................. G06T 1/00
[52] U.S. Cl. ........................................... 345/302; 345/342
[58] Field of Search ............................... 395/806, 807, 395/342, 346, 327, 328; 345/302, 342, 346, 327, 328; 348/584, 588, 596

[56] References Cited

U.S. PATENT DOCUMENTS

| | | | |
|---|---|---|---|
| 5,196,934 | 3/1993 | Fleischman et al. | 348/581 |
| 5,227,771 | 7/1993 | Kerr et al. | 345/119 |
| 5,455,904 | 10/1995 | Bouchet et al. | 395/346 |
| 5,524,193 | 6/1996 | Covington et al. | 395/773 |

FOREIGN PATENT DOCUMENTS

WO 94/01964  1/1994  WIPO.

*Primary Examiner*—Joseph H. Feild
*Attorney, Agent, or Firm*—Flynn, Thiel, Boutell & Tanis, P.C.

[57] ABSTRACT

A computer display system and method for displaying a sequence of video images in a portion of a graphic display. The video images are provided to the system along with a first set commands that define the size of the images relative to the display as well as their position for insertion into the display. A command modifier, internal to the display system modifies the first set of video image size/position commands to produce a second set of commands. These modifications are performed by the command modifier in response to signals such as from user-generated commands. The second set of video image size/position commands are then forwarded, respectively to a scaling unit and a image insertion unit. The scaling unit scales the video image signals based on the size commands contained in the second set of commands. The insertion unit inserts the scaled video image sequence into the graphics display based on the second set of commands.

20 Claims, 3 Drawing Sheets

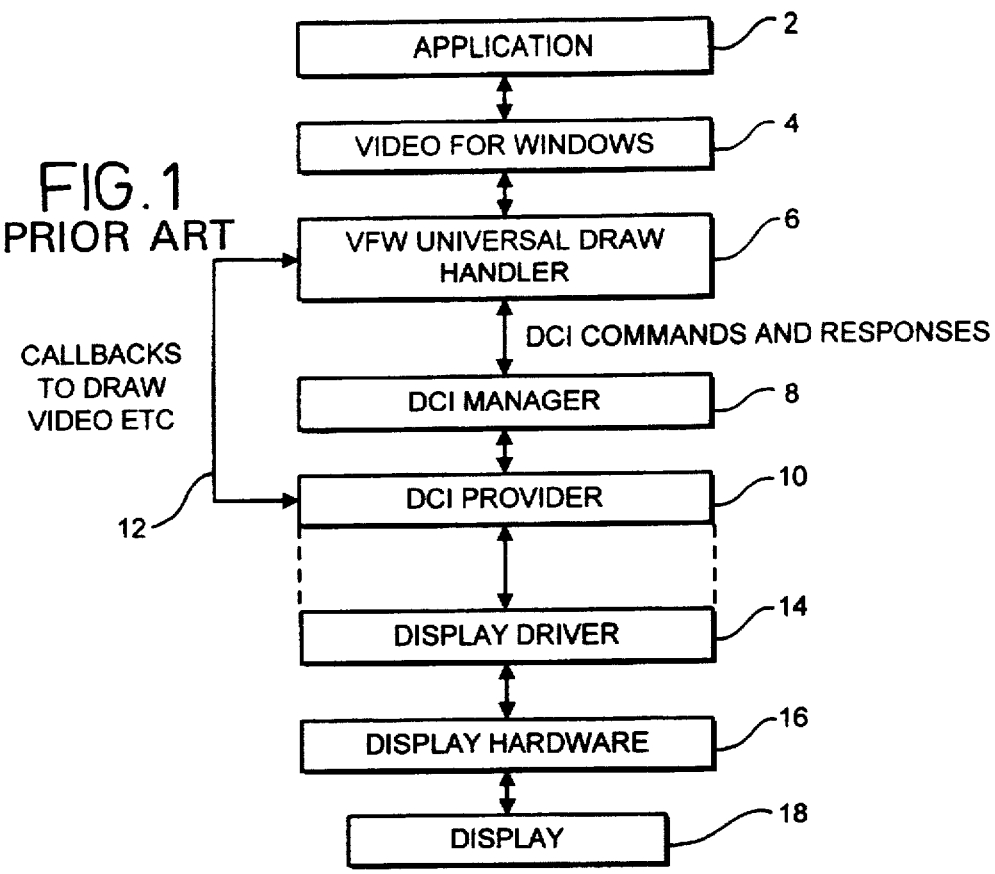
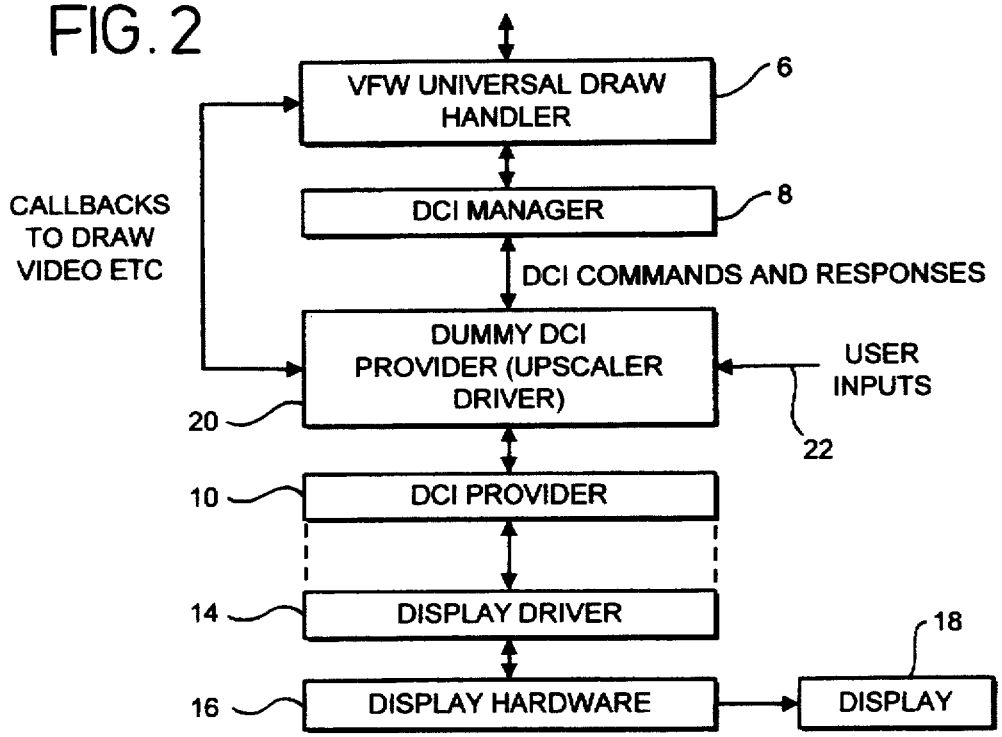

COMPUTER DISPLAY SYSTEMS

FIELD OF THE INVENTION

This invention relates to computer display systems and in particular to computer display systems which enable moving video images to be displayed in a portion of a graphic display.

BACKGROUND OF THE INVENTION

As multimedia computer systems have been developed in recent years it has become necessary to include moving video displays within graphic displays in computers. The video source material for said displays is usually compressed digital video. A plurality of compression techniques and playback options exist. Playback may be assisted by dedicated hardware, for example an MPEG (Motion Picture Experts Group) decoder or alternatively may use the standard graphics hardware already supplied on personal computers. An example of the latter case is the Microsoft (registered trade mark) Video for Windows (VfW) package which is designed to provide a user with the ability to display video images in the Microsoft Windows operating system on a standard PC, without the need to add on video hardware. This type of facility is generally referred to as software video.

The performance limitation of software video is largely one of available bandwidth. Factors which effect this include image size, frame rate, bit-depth and picture complexity. To limit bandwidth video designed for software playback is typically produced at reduced frame rates of the order of 10 to 15 frames per second rather than the usual 25/30 frames per second. Also, to limit the bandwidth, the bit-depth of the video for software playback is usually 16 bits. This provides the best compromise between image quality and data rate. The complexity of the image being viewed has less impact and it usually not a factor which can be easily changed. The other key parameter is therefore image size, that is to say the size of the area on the screen used for video playback. With the current Microsoft Video for Windows package this must usually be limited to 320 by 240 pixels to provide playback of acceptable quality at a frame rate of 15 frames per second and with a bit depth of 16 bits per pixel. Sizes larger than this will show considerable loss of resolution in the video image.

Many software application packages which use video images are themselves designed to run at a fixed screen size (e.g. 640 by 480 pixels). This is partly to simplify design and implementation and partly for historical reasons since this is the VGA standard display size. Any video data displayed in these applications will be shown in a portion of this screen area. Some application programs will enable the user to select between this smaller portion of the display area and a full screen display (640 by 480 pixels). It will therefore be appreciated that for the majority of application programs the video data may only be displayed in a small area, eg. 160 by 120 pixels, of the display and unless the particular application program allows the window to be resized in some way the user is unable to view the video image except at the pre-defined small size.

Video data is delivered to a screen for display via a display interface such as the Microsoft and Intel display control interface (DCI). Interfaces of this type receive data from the application software producing the video image as to the size of window (portion of the screen) to be used for video data and arrange for the data to be delivered to the screen in that area within a graphic display.

In our British Patent Application No. 9422913.5 we have proposed a system for upscaling video data for display on a portion of a computer display in which additional lines of video data are interpolated from the lines of source data. The system enables video data to be upscaled without loss of resolution or frame rate. However, the upscaling system is situated, effectively, between the display interface and the screen. It is therefore dependent on instructions received via the display interface concerning the size of video image it is to produce. When an application program having fixed video display sizes is running these are the sizes which will be supplied to the upscaling system and no further upscaling is possible. Thus, even with the appropriate modification to the system to enable video upscaling without loss of resolution and frame rate (acceleration), it is not always possible to in fact upscale video images in many software packages.

SUMMARY OF THE INVENTION

Preferred embodiments of the present invention provide a system which intercepts video data and the control signals associated with it as it is sent to a display interface from an application program and enable its specified size of windows and position within a display to be altered. Thus the capability of upscaling video from any application package is possible whether or not that package has a scalable video window. In one preferred embodiment the invention enables the video window to be played back at full screen size.

In a further preferred embodiment the video window may be set to any size under the control of the user.

A control input may be provided to enable the interception of the video data and subsequent upscaling to be switched off by the user.

Preferably the interception and upscaling is automatically switched on at commencement of playback of video data and automatically switched off at the end of playback.

The invention is defined in the appended claims to which reference should now be made.

BRIEF DESCRIPTION OF THE DRAWINGS

A preferred embodiment of the invention will now be described in detail by way of example with reference to accompanying drawings in which:

FIG. 1 shows a schematic block diagram of a prior art arrangement for displaying video data on a computer display;

FIG. 2 shows a portion of the block diagram of FIG. 1 modified in accordance with an embodiment of the invention;

DETAILED DESCRIPTION OF A PREFERRED EMBODIMENT

Figure 3:
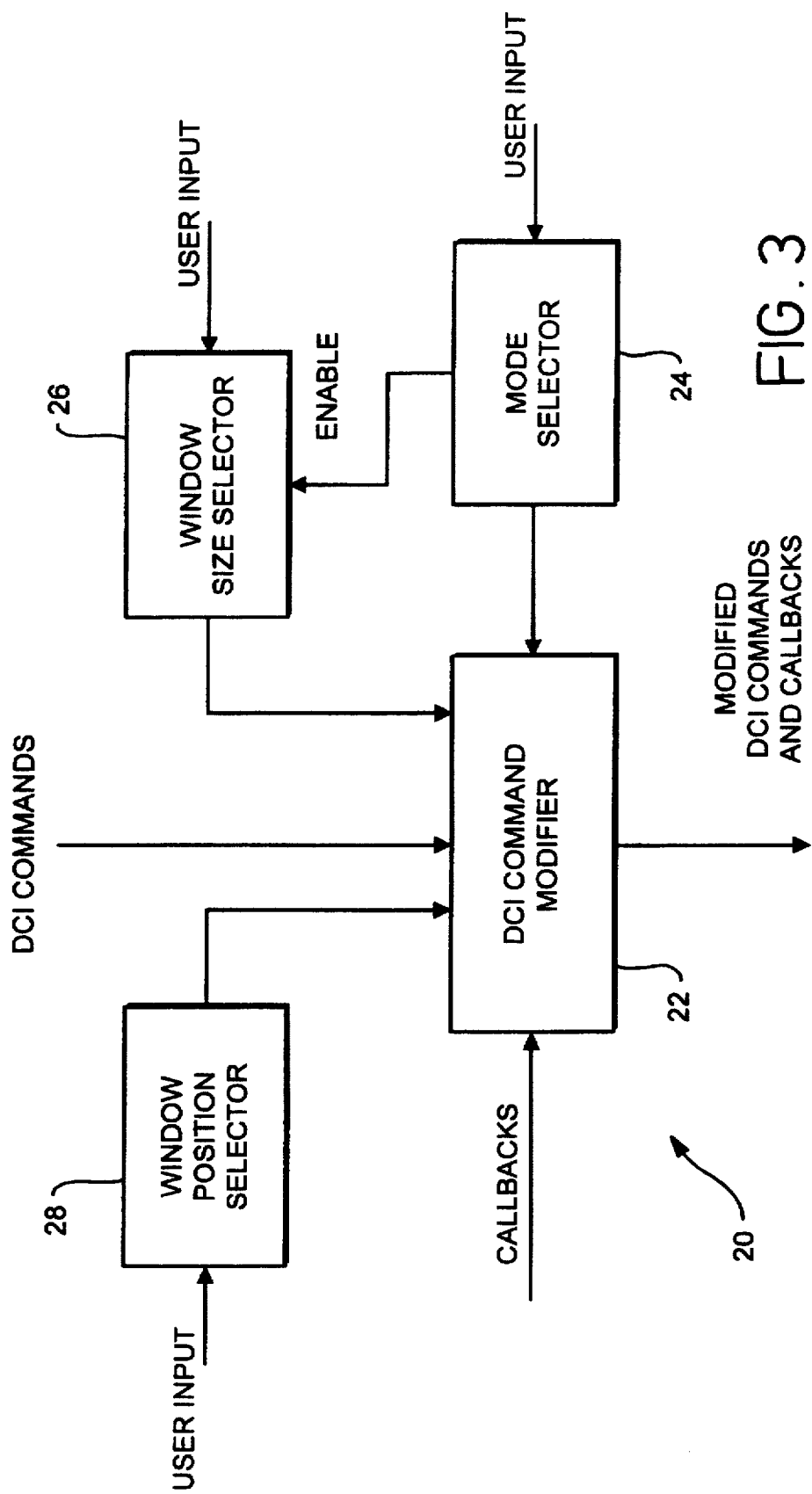
FIG. 3 shows a schematic block diagram of the dummy DCI provider of FIG. 2 embodying the invention.

In FIG. 1 the prior art arrangement is illustrated in schematic block form. This comprises an application program 2, which includes video data, running on a CPU of a PC. Also running is the Video for Windows Software package 4 which configures the system to enable video from the application package to be made available for display on a portion of the computer screen. The Microsoft (registered trade mark) display control interface (DCI) communicates between the Video for Windows system and the display and its associated drivers and hardware.

The components of DCI are a universal draw handler (UDH) 6 which handles the drawing of frames of video to the screen, via the DCI when it is installed, and otherwise via the conventional graphics interface provided by Microsoft Windows on a personal computer. It handles the size and position of video windows and arranges data for writing to the main screen frame buffer. It uses two types of memory in writing data to screen. These are primary and off-screen. The primary memory is the screen frame buffer in which data for display is compiled and the off-screen memory is used to store video data, prior to drawing to the frame buffer. It is used, for example, for temporarily storing decompressed video data. The actual drawing of video to screen is achieved by writing data in the off screen memory into the screen frame buffer to produce a single on-screen image.

The DCI manager is used to manage commands from the UDH 6 for particular areas of main screen frame buffer for the drawing of video data. These requests are passed to a DCI provider (10) which can access the main graphics hardware (including the screen frame buffer) of the PC. In operation access to the graphics hardware is initiated by a command from the DCI manager. Once initiated video data is actually sent to the DCI provider and hence to the graphics hardware via a callback signal 12.

Video data and its specified area on the display is passed by the DCI provider 10 to the display driver 14. Display driver 14 then passes the video data to the display hardware 16 and then on to the display 18. The display hardware 16 may include a system for upscaling of the type described in British Patent Application No. 9422913.5. However, as explained above, the position and size of video windows are dictated by the commands specified in an application program and any upscaling implemented will only be to the sizes and positions specified in that application program.

A modified system embodying the invention is shown in FIG. 2. In this a dummy DCI provider (upscaler driver) 20 is positioned between the DCI manager 8 and the DCI provider 10. This dummy DCI provider then receives from the DCI manager all commands which were intended for the original DCI provider 10 and, by means of user inputs, is able to modify the size and position of the video window selected. The three main commands are enable, disable, and control for video data. The latter commands allows the creation of the area of off screen memory for processing of video data prior to inclusion of this data in the screen frame buffer. The dummy DCI provider 20 is responsive to user inputs to modify the size of the window in the screen frame buffer to which data from the off screen memory is to be written and also to vary the position of that window.

Once the commands have been modified by the dummy DCI provider 20, to produce a second set of commands, it passes the new commands to the DCI provider 10 which then treats them in the same way as commands received in the system of FIG. 1. The dummy DCI provider also replaces the various callback functions which DCI provider 10 would have sent to the UDH6. This allows the dummy DCI provider to also receive callbacks from the UDH6 which would otherwise have gone to the original DCI provider 10, and to inspect them and if necessary change various parameters before sending them on to the original DCI provider 10.

The callbacks which are of most interest are Draw (drawing) video from the application software through to the off screen memory, SetDestination for setting video size and position, and SetClipList which defines where within the specified window in the display for video data video can actually be drawn, ie. it defines where other graphics windows are overlapping the video window and prevents writing of video data into these overlapping areas.

Once installed between the DCI manager 8 and the original DCI provider 10 the dummy DCI provider 20 can override the SetDestination and SetClipList requests received from the application software via the UDH6 and set the video destination rectangle to a different position and to a different size. This is achieved as shown in FIG. 3. In this there is illustrated a DCI command modifier 22 which receives DCI commands from the DCI manager 8. This DCI command modifier also receives callbacks such as SetDestination and SetClipList from the UDH 6. There are a further three user inputs. The first user input is to a mode selector 24. This enables a user to select different modes of video upscaling. These could be as follows:

1. No upscaling. In this mode the system would operate as if the dummy DCI provider 20 were not in position.

2. Full screen display. In this mode the dummy DCI provider will modify SetDestination commands to upscale the video window from an application program to fill the whole of the display area.

3. Variable window size. This is will enable a user to specify window size and window position.

The mode selector 24 sets the DCI command modifier to operate in the selective mode in response to a user input. It also sends an enable signal to a window size selector 26 and (not illustrated) a further enable signal to a window position selector 28. The window size selector and the window position selector 28 have user inputs for size and position. These user inputs may be driven by a keyboard or by a mouse.

Using the user inputs of the dummy DCI provider 20 illustrated in FIG. 3 it is therefore possible for a user to control the size and position of a video window from an application program irrespective of whether or not that application program has an inbuilt facility for upscaling video windows.

As discussed above the video window specified by the user can be resizeable or can be fixed to full display size. It is preferable for any upscaling of the video window to be triggered on commencement of playback of the video data and to end automatically on termination of video playback. To do this the DCI command modifier monitors the frequency of Draw callbacks from the UDH (a Draw callback is a call to write the next frame of video data to the off screen memory). If the DCI command modifier receives a predetermined number of frames within a pre-determined (small) interval of time, eg. half a second, video playback is assumed to have commenced. The DCI command modifier is then activated to modify the video window to the user selected size and position, the original application video window is blacked out and upscaling is triggered. The DCI command modifier looks at the Draw commands after commencement of playback every half second, for example, and, if no change in Draw command has taken place during that period of time it is assumed that playback has ceased. The upscaled video window is then switched off and still video data is redrawn once to the original sized application window.

This triggering of switching between playback modes is not limited to switching between size of display. It can be used with other modifications of video data or may be used to switch on or off some other application software.

Figure 4:
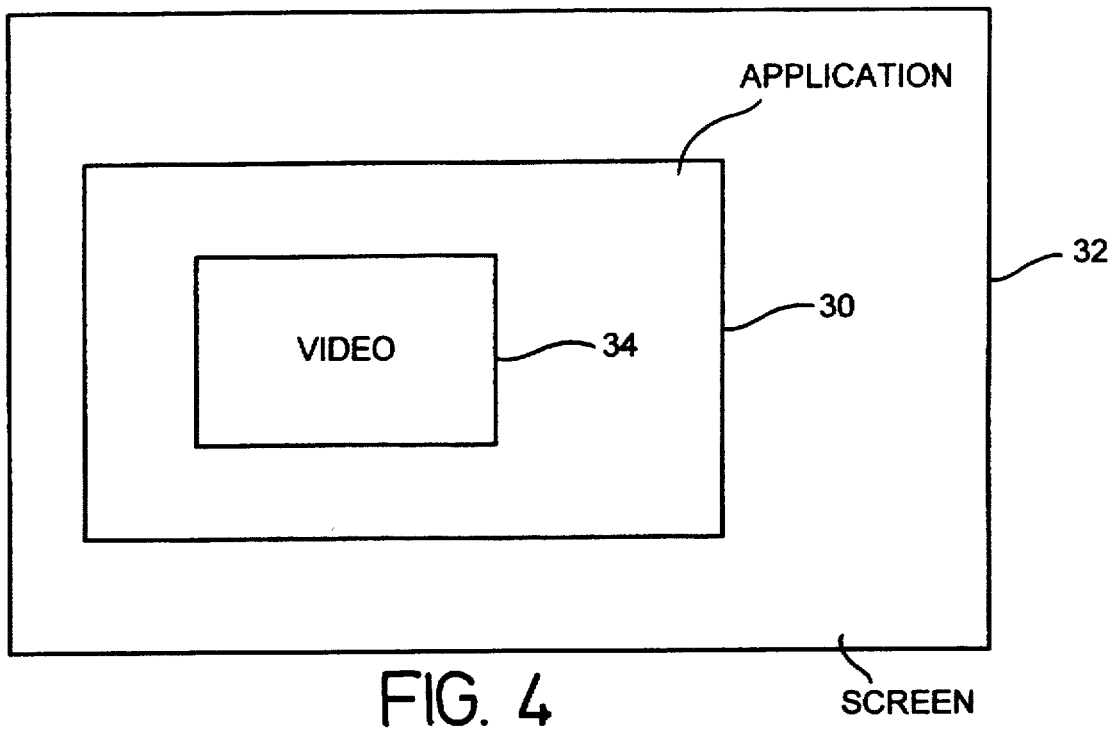
FIG. 4 shows schematically the area of a display specified by an application program for a video image using the prior art arrangement.
Figure 5:
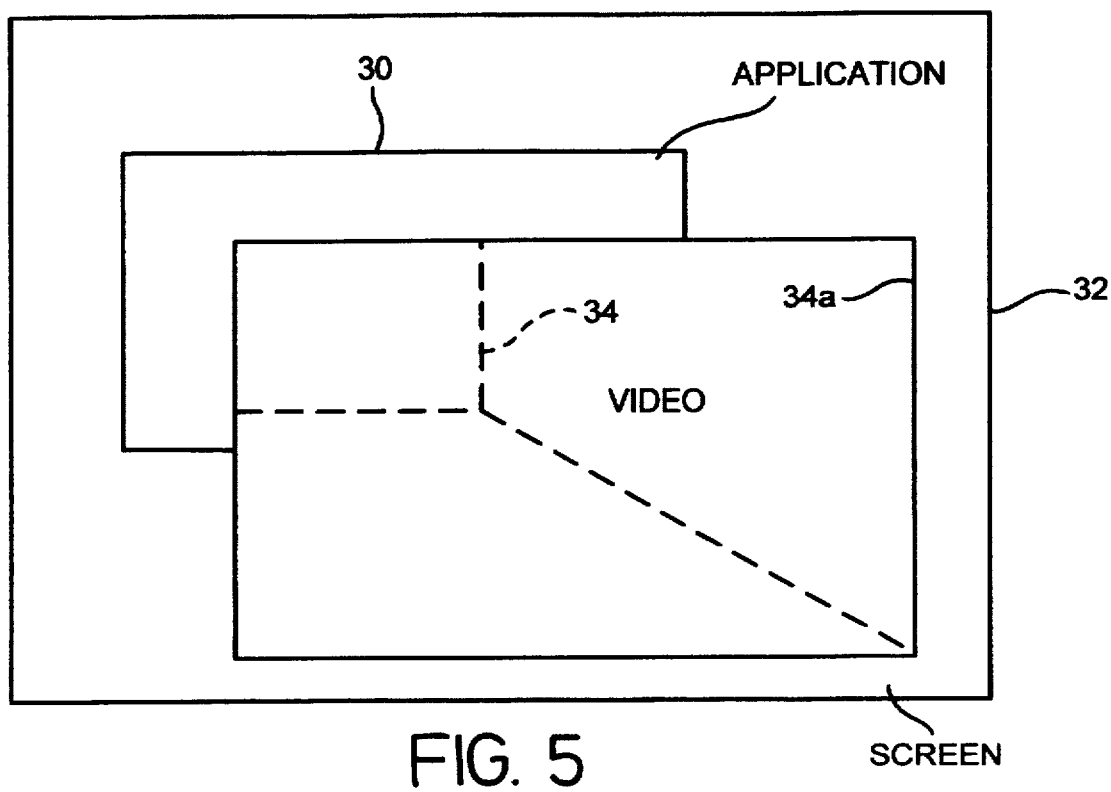
FIG. 5 shows the same application with video window in the display upscaled by an embodiment of the invention.

The effect of the upscaler driver is shown schematically in FIGS. 4 and 5. FIG. 4 shows a software application window 30 on a screen 32. Within the application window 30 is a video window 34 of fixed size. This is the display which will be produced by the arrangement of FIG. 1.

In FIG. 5 a display of the type produced by the arrangement of FIG. 2 is shown. In this the video window 34A is enlarged from the window 34 within the original application window 30 to a user specified size.

Actual upscaling of the video data takes place using the system of upscaling described in our British Patent Application No. 9422913.5. This ensures that irrespective of the original resolution of the video data the upscaled video data can be at the same frame rate and at the same resolution by virtue of interpolation of additional lines of video data. Thus the enlarged video window does not display data with the block like structure associated with prior art upscaled video data.

User control of the upscaler driver can be implemented by a small control program running on the PC which is able to display a tool bar for selecting various modes of playback with a mouse. This could be arranged, for example, to have a button which switches upscaling on and off and one which switches between user defined and full screen playback. In addition the video window can be configured to contain a maximize size button and a minimize size button to allow switching between the two playback modes.

The technique described herein is not limited to use with the Microsoft display control interface (DCI) system or to Microsoft Window operating system and can be applied to any other computer video delivery systems and operating systems.

It will be clear to those skilled in the art that the embodiment of the invention described above can be implemented in either software or in dedicated hardware or with a combination of the two.

We claim:

1. A computer display system for displaying a sequence of video images in at least a portion of a graphic display comprising:
   means for receiving the sequence of video images;
   means for receiving data defining a predetermined size and position of the portion of the graphic display in which the video images are to be displayed;
   means for selectively intercepting the data defining the size and position of the video image said portion of the graphic display;
   means for selectively modifying the intercepted data defining the size and position of the video image portion of the graphic display;
   means for scaling the video images to a modified size defined by the modified data defining the size of the video image; and
   means for inserting the scaled video images into a portion of the graphic display based on the modified data defining the size and position of the video image in the graphic display.

2. The computer display system according to claim 1, in which the intercepting means and the modifying means are responsive to user inputs.

3. The computer display system according to claim 2, further including a first user input to selectively activate the intercepting means and the modifying means.

4. The computer display system according to claim 3, in which the first user input is operable to select a full screen playback mode for display of the sequence of video images on the graphics display.

5. The computer display system according to claim 2, wherein a first user input is connected to the modifying means and is operable to allow a user to selectively activate the modifying means to selectively cause the modifying means to produce data to cause the video image to fill a whole screen of the graphics display or to cause the modifying means to produce data that defines a variable size video image on the graphics display.

6. The computer display system according to claim 5, wherein a second user input is connected to the modifying means for allowing the user to select the size of the video image portion of the graphic display occupied by the video images and, in response to select user inputs, the modifying means produces data defining the size of the video images that are different from the data defining the size of the video images received by the means for receiving data.

7. The computer display system according to claim 6, wherein a third user input is connected to the modifying means for allowing the user to select the position in the graphic display occupied by the video images and, in response to select user inputs, the modifying means produces data defining the position of the video images in the graphics display that are different from the data defining the position of the video images received by the means for receiving data.

8. The computer display system of claim 1, wherein:
   the means for receiving data defining the size and position of the video image portion receives data defining the size of the video images as one from a predefined set of video image sizes and data defining the position of the video image portion as one from a predefined set of video image positions; and
   the modifying means is capable of producing the modified data so that the modified data defines the size of the video image portions so that the size is different from the size specified from the first set of video image sizes or the modified data defines the video image position so that the position is different from the position specified from the predefined set of image placement positions.

9. A method for displaying a sequence of video images on a computer display system in at least a portion of a graphic display comprising the steps of:
   receiving the sequence of video images;
   receiving data defining a predetermined size and position of the portion of the graphic display into which the video images are to be inserted;
   selectively intercepting the data defining the video image portion of the graphic display;
   selectively modifying the intercepted data defining the size and position of the video image portion of the graphic display;
   scaling the video image to a modified size defined by the modified data; and
   inserting the video images into a portion of the graphic display based on the modified data defining the size and position of the video image portion in the graphic display as modified by the modifying means.

10. The method of displaying video images of claim 9, wherein:
   during the step of receiving data, the data received defines the size of the video image portion as one from a first set of sizes and defines the position of the video image portion as one from a first set of positions;
   during the step of modifying the data, a second set of data are produced that define the size of the video image portion as a size different from the first set of sizes or that define the position as a position different from the first set of positions.

11. The method of displaying video images of claim 10, wherein:

the step of intercepting data and the step of modifying data are performed in response to an user-generated command;

when the intercepting data step and the step of modifying data are not performed, the video image scaling step is performed based on the data received during the step of receiving the data; and when the intercepting data step and the step of modifying data are not performed, the video image insertion step is performed based on the data received during the step of receiving the data.

12. A method for automatically switching between first and second display modes for video images on a graphic display comprising the steps of:

displaying a video image in a first mode;

monitoring changes in data in the video image to determine whether playback of a sequence of images has commenced or ceased;

switching to a second mode of display in response to commencement of playback of the sequence; and switching back to the first mode of display in response to termination of playback of a sequence of video images.

13. A method according to claim 12 in which the first mode of display comprises inserting video images into a first portion of the graphic display and the second mode of display comprises inserting the images into a larger second portion of the graphic display.

14. A computer display system for displaying a sequence of video images in at least a portion of a graphic display comprising:

means for receiving data containing the video images;

means for receiving a first set of image placement commands defining a predetermined size and position of the portion of the graphic display in which the video images are to be displayed;

modifying means for receiving the first set of image placement commands and modifying the first set of image placement commands to produce a second set of image placement commands that define a video image size or a video image position for the video images that is different from the size or the position defined by the first set of image placement commands;

scaling means for receiving the video image data and the second set of image placement commands defining the video image size and for scaling the video image data to produce scaled video image data representative of the size of the video images defined by the second set of image placement commands defining video image size; and insertion means for receiving the scaled video image data and the second set of video image placement commands defining image position and inserting a scaled video image based on the scaled video image data into a select position in a data set defining the graphic display based on the second set of image placement commands defining video image position; and display means for receiving the data set defining the graphics display for producing the graphic display including the selectively sized or selectively placed video image therein.

15. The computer display system of claim 14, wherein:

the first set of image placement commands are capable of defining the size of the video images as one from a first set of video image sizes and are capable of defining the position of the portion of the graphics display in which the video images are positioned as one from a first set of video image positions; and said modifying means is capable of producing the second set of image placement commands so that the second set of image placement commands define the size of the video images as being different from the sizes specified in the first set of video image sizes or the position of the portion of the graphics display in which the video images are positioned as being different from the positions specified in the first set of video image positions.

16. The computer display system of claim 15, wherein:

said modifying means is selectively actuated in response to a user-generated command;

when said modifying means is not actuated, said scaling means produces scaled video image data based on the first set of image placement commands; and when said modifying means is not actuated, said insertion means inserts the scaled video image into the select position in the data set defining the graphic display based on the first set of image placement commands.

17. The computer display system of claim 14, wherein:

said modifying means is selectively actuated in response to a user-generated command;

when said modifying means is not actuated, said scaling means produces scaled video image data based on the first set of image placement commands; and when said modifying means is not actuated, said insertion means inserts the scaled video image into the select position in the data set defining the graphic display based on the first set of image placement commands.

18. A computer display system for displaying a sequence of video images in at least a portion of a graphic display comprising:

means for receiving the sequence of video images;

means for receiving data defining a predetermined size and a predetermined position of a video image portion of the graphic display in which the video images are to be displayed;

user input means;

intercepting means responsive to said user input means for selectively intercepting the data defining the size and the position of the video image portion of the graphic display;

modifying means responsive to said user input means for selectively modifying the data defining the size and the position of the video image portion of the graphic display;

means for scaling the sequence of video images to a modified size based on the modified data defining the size of the video image portion; and means for inserting the sequence of video images into a portion of the graphics display as defined by the modified data defining the position of the video image portion in the graphics display.

19. The computer display system of claim 18, wherein, if said intercepting means and said modifying means are not actuated by said user input means: said scaling means scales the video images based on the data defining video image size received by said means for receiving data; and said insertion means inserts the graphics images into the graphics display based on the data defining video image position received by said means for receiving data.

20. The computer display system of claim 18, wherein said modifying means, in response to said user input means, produces data defining the size of the video image portion that is different from the size defined by the data received by said means for receiving data or produces data defining the position of the video image portion that is different from the video image position defined by the data received by said means for receiving data.

* * * * *

UNITED STATES PATENT AND TRADEMARK OFFICE
CERTIFICATE OF CORRECTION

PATENT NO. : 5 801 686
DATED : September 1, 1998
INVENTOR(S) : Nicholas H. JURASCHECK et al It is certified that error appears in the above-indentified patent and that said Letters Patent is hereby corrected as shown below:

Column 5, line 47; change "video image said portion" to ---video image portion---.

Signed and Sealed this

Fifteenth Day of December, 1998

*Attest:*

BRUCE LEHMAN

*Attesting Officer*     *Commissioner of Patents and Trademarks*